United States Patent Office 3,228,983
Patented Jan. 11, 1966

3,228,983
PRODUCTION OF POLYACETYL METHYLENE DIAMINES
John Alec John, Duffield, Derby, Gordon Ernest Smith, Chattesden, Derby, and George Alfred Dale, Glossop, Manchester, England, assignors to British Celanese Limited, County of London, England, a British company
No Drawing. Filed Aug. 9, 1963, Ser. No. 301,192
Claims priority, application Great Britain, Aug. 20, 1962, 31,816/62
2 Claims. (Cl. 260—561)

This invention relates to the production of polyacetyl methylene diamines.

British patent specification No. 907,357 which was divided out of specification No. 907,356, describes novel compounds having the general formula:

$$\begin{array}{c} R' \\ \diagdown \\ N-CH_2-N \\ \diagup \\ COCH_3 \end{array} \begin{array}{c} COCH_3 \\ \diagup \\ \diagdown \\ COCH_3 \end{array}$$

in which R' is hydrogen (in which case the compound is N,N'-triacetyl methylene diamine) or an acetyl group (in which case the compound is N,N,N',N'-tetra-acetyl methylene diamine).

These compounds, or mixtures of them, may be used in washing or bleaching compositions containing oxygen-yielding bleaching agents as described in British specification No. 907,356.

The polyacetyl methylene diamines as described above may be obtained from formaldehyde, acetamide and an acetylating agent, ketene, in a two-stage reaction as follows:

(1)
$2CH_3$—CO—$NH_2$+$CH_2O$
→$COCH_3$—NH—$CH_2$—NH—$COCH_3$
(N,N'-diacetyl methylene diamine)

(2(a))
$COCH_3$—NH—$CH_2$—NH—$COCH_3$+$CH_2$=CO
→$(COCH_3)_2N$—$CH_2$—NH—$COCH_3$ (2(b))
$COCH_3$—NH—$CH_2$—NH—$COCH_3$+$2CH_2$=CO
→$(COCH_3)_2N$—$CH_2$—$N(COCH_3)_2$

The above-mentioned specification No. 907,357 states that the ketene Reactions 2(a) and 2(b) may be carried out in an inert organic liquid diluent and benzene is given as an example of a suitable diluent.

We have now found that it is particularly advantageous to use as the liquid reaction medium for both stages a high-boiling organic liquid, that is to say, an organic liquid boiling in the range of 100° to 200° C. The high-boiling liquid used must be inert to all of the reactants used and must also be stable under the particular reaction conditions used. Butyl acetate is one example of a suitable organic liquid but other liquids such as xylene or diacetyl ethylene glycol may be used.

A particular advantage of the use of butyl acetate is that N,N'-diacetyl methylene diamine is practically insoluble in the liquid at the reaction temperatures whereas the product of acetylation, N,N,N',N'-tetra-acetyl methylene diamine is soluble. This provides an additional means of judging when the reaction is complete and, if necessary, a method of separating the tetra-acetyl product from unreacted N,N'-diacetyl methylene diamine.

Accordingly, the present invention includes a process for the preparation of a compound having the general formula:

$$\begin{array}{c} R' \\ \diagdown \\ N-CH_2-N \\ \diagup \\ COCH_3 \end{array} \begin{array}{c} COCH_3 \\ \diagup \\ \diagdown \\ COCH_3 \end{array}$$

R' being a hydrogen atom or an acetyl group, by acetylating, with ketene, N,N'-diacetyl methylene diamine in the presence of a high-boiling organic liquid as defined herein.

The invention also includes the preparation of N,N'-diacetyl methylene diamine by reacting formaldehyde and acetamide in the presence of a high-boiling organic liquid as defined herein. This reaction mixture including solvent may be acetylated directly without separating or purifying the intermediate N,N'-diacetyl methylene diamine.

The use of a high-boiling liquid such as butyl acetate as the solvent medium in the preparation of the N,N'-diacetyl methylene diamine gives a considerable increase in the reaction velocity as compared with low-boiling liquids such as benzene and ethyl acetate. In the acetylation reaction, the use of the high-boiling liquid enables ketene to be used, at reduced pressure, as generated from the manufacturing unit and thus avoids the need to compress the ketene prior to the reaction. At the reduced pressures and temperatures used the high-boiling liquids have a reduced tendency to evaporate compared with the old low-boiling solvents. The use of high-boiling liquids in both stages of the reaction permits a continuous process for the manufacture of tri- and tetra-acetylmethylene diamines.

Both stages of the process may be carried out at pressures other than atmospheric; for example superatmospheric pressures may be used in the first stage (Reaction 1) and reduced pressures may be used in the second stage (Reactions 2(a) and 2(b)).

The invention is illustrated by the following examples, parts being by weight.

*Example 1*

150 parts of acetamide free from ammonium acetate, 42 parts of 97 percent paraformaldehyde (that is, a 2:1.08 molar ratio of acetamide to formaldehyde) and 150 parts of butyl acetate were mixed at room temperature and 5.0 parts of sulphuric acid (as catalyst) were added. The mixture, which was stirred continuously, was heated to refluxing temperature and water formed by the reaction was removed as it was formed by means of a Dean-Stark head. When the distillation of water had ceased, usually after 40–50 minutes, as indicated by a marked rise in temperature at the head, the reaction mixture was cooled. The product was a suspension of N,N'-diacetyl methylene diamine in butyl acetate which was used direct in Example 2.

*Example 2*

The product of Example 1 was placed in a vessel and was stirred continuously at a temperature of 70° to 75° C. and a pressure of 200 mm. mercury while ketene gas was drawn through the suspension by means of an oil pump at a rate of 30 parts of ketene per hour. The reaction to convert the N,N'-diacetyl methylene diamine to the N,N,N',N'-tetra-acetyl methylene diamine was completed after 3 hours 40 minutes. The product, while hot, was a honey-coloured solution which was cooled and the first crop of crystals (148 parts) was filtered off. The filtrate was heated to distil off butyl acetate and on cooling a further crop (42 parts) of crystals was obtained. The two lots of crystals of N,N,N',N'-tetra-acetyl methylene diamine were combined, washed in butyl acetate and dried. The yield was 70 percent based on the acetamide used in Example 1.

*Example 3*

748.7 parts of acetamide, 214 parts of paraformaldehyde (that is 10 percent molar excess) and 1500 parts of xylene were mixed at room temperature and 3.75 parts of sulphuric acid were added. The mixture was heated as described in Example 1 for 2¼ hours to produce a suspension of N,N'-diacetyl methylene diamine in xylene. The solid product was filtered off, and the yield of crude (85 percent) product was 810 parts.

The product, preferably after washing with acetone, may be suspended in butyl acetate and reacted with ketene as described in Example 2.

What we claim is:

1. In a process for the production of chemical compounds having the formula:

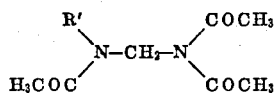

in which R' is selected from the group consisting of a hydrogen atom and an acetyl group, by the acetylation of N,N'-diacetyl methylene diamine with ketene, the improvement which comprises conducting said acetylation in butyl acetate at a temperature below the boiling point of butyl acetate and under a subatmospheric pressure.

2. In a process for the production of chemical compounds having the formula:

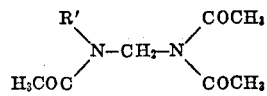

where R' is selected from the class consisting of hydrogen and the acetyl group, by reacting formaldehyde and acetamide to form N,N'-diacetyl methylene diamine and then reacting the N,N'-diacetyl methylene diamine with ketene, the improvement which comprises carrying out the reaction between formaldehyde and acetamide in the presence of butyl acetate and then mixing ketene directly with the resulting reaction mixture, at a temperature below the boiling point of butyl acetate and under a subatmospheric pressure.

References Cited by the Examiner

FOREIGN PATENTS 907,357   10/1962   Great Britain.

WALTER A. MODANCE, *Primary Examiner.*

NICHOLAS RIZZO, ROBERT L. PRICE, NATALIE TROUSOF, *Assistant Examiners.*